UNITED STATES PATENT OFFICE.

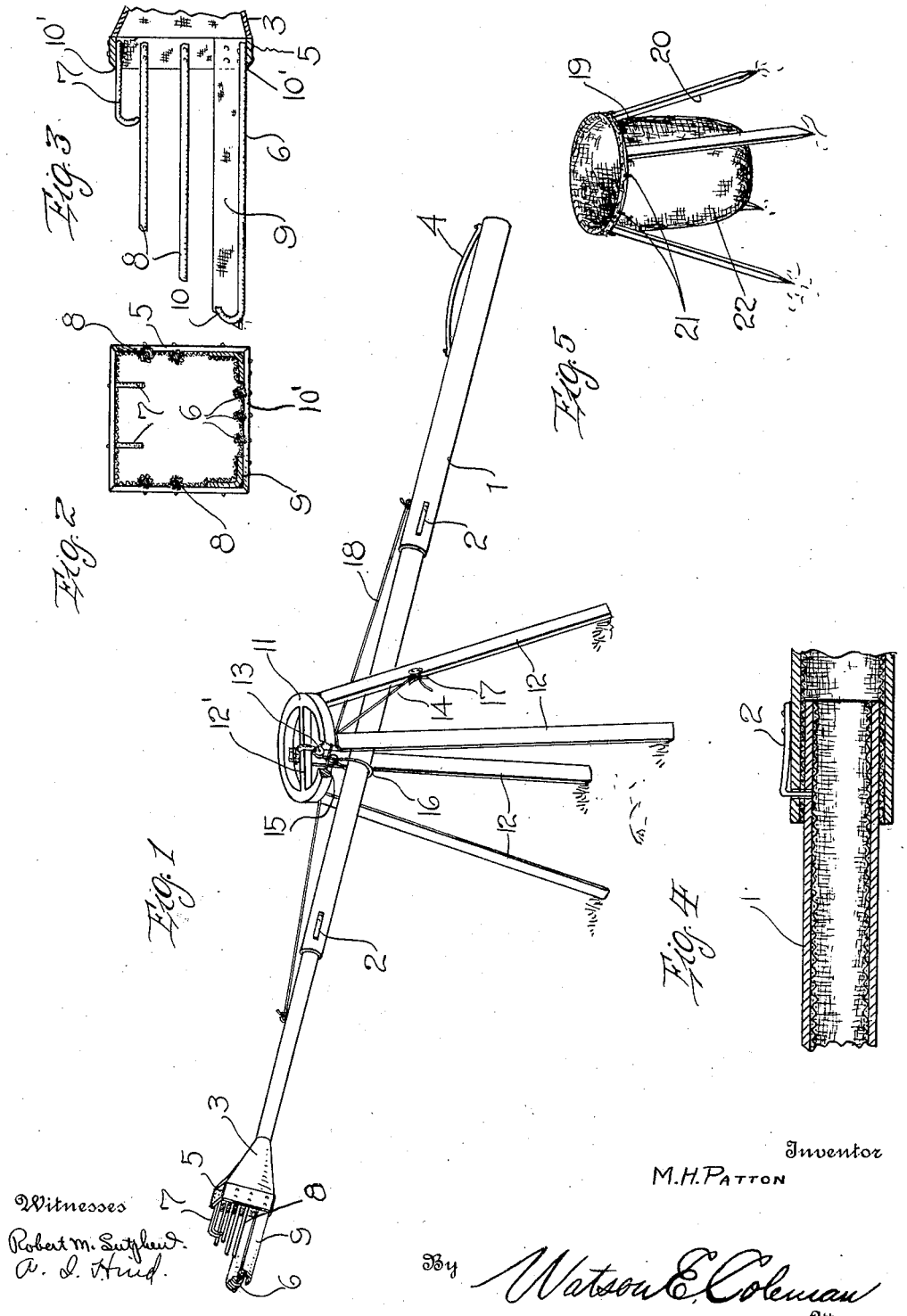

MICHIEL H. PATTON, OF KESTER, WEST VIRGINIA.

FRUIT-GATHERER.

1,088,170.

Specification of Letters Patent.   Patented Feb. 24, 1914.

Application filed May 1, 1913. Serial No. 764,969.

*To all whom it may concern:*

Be it known that I, MICHIEL H. PATTON, a citizen of the United States, residing at Kester, in the county of Roane and State of West Virginia, have invented certain new and useful Improvements in Fruit-Gatherers, of which the following is a specification, reference being had to the accompanying drawings.

This invention relates to new and useful improvements in fruit gatherers and has for its object to provide a simple and efficient device of this character which will readily remove fruit from the trees and conduct the same to the operator.

A further object of the invention resides in providing a device consisting of an extensible tubular member having a plurality of hooks at the upper extremity thereof, and a still further object of the invention resides in providing an adjustable support for the tubular member.

Still another object of the invention resides in providing a device which is simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claims.

In the accompanying drawing forming a part of this application, Figure 1 is a perspective view of the device completely set up for use and showing parts of the support broken away. Fig. 2 is a horizontal section through the severing or grab portion of the device. Fig. 3 is a horizontal section therethrough. Fig. 4 is a fragmentary longitudinal section through the tubular member; and Fig. 5 is a perspective view of the support carrying the sack for receiving the fruit, after the same has been removed from the trees.

In describing my invention, I shall refer to the drawing in which similar reference characters designate corresponding parts throughout the several views and in which—

1 indicates a metallic tubular member formed of telescoping sections which are adapted to be adjustably held together by means of the spring locking lugs 2, secured to the respective sections and the free end of the upper section of said member is flared outwardly, as shown at 3. The inner walls of the sections of said tubular member are lined with a soft material, such as flannel, felt or the like, to prevent the bruising of the fruit as the latter passes therethrough and the lower section of the telescoping section 1 is provided with a handle member 4. Secured to the outer free edge of the flared portion of the upper section of said member 1 is a band or the like 5, which is preferably rectangular in plan and mounted on the one side arm of this rectangular band and projecting outwardly therefrom, are a trio of hook members 6. The opposite side arm thereof which, for convenience, will be termed the top side of the band, has a pair of hooks 7 projecting therefrom, while the two remaining side arms are provided with a pair of outwardly projecting pins or guide arms 8. As many of these hooks 6 and 7 may be provided as are found desirable, although I have shown but a trio of hooks 6 and a pair of hooks 7, and these hooks, together with the pins or guide arms 8 project outwardly or longitudinally of the device, the same being covered with rubber or other soft material.

Secured to the corners of the band 5, which form the junctions between the arms thereof having the hooks 6 thereon and the arms having the pins 8 thereon, are the angular and outwardly projecting guide walls or the like 9. These guide walls which may be formed of wood or metal, as desired, have the inner faces thereof lined with felt, rubber or any other desired material, to prevent the bruising of the fruit as the same contacts therewith, and the same extend outwardly to points just beyond the outer ends of the hooks 6, the extreme outer ends of said walls being beveled, as shown at 10. The purpose of the same will be hereinafter and more particularly set forth. It must here be stated that the outer edges of the band 5 are sharpened to form guide edges, as shown at 10', which obviously, forms a means for severing the fruit from the trees.

I have provided a support for the member above described, which consists of a head piece 11 and a plurality of supporting legs 12 hingedly secured thereto. This head piece 11 is, in effect, a ring or circular band, having a diametrical bar 12' formed thereon and suspended from the central or diametrical bar, between the upper hinged ends of the supporting legs 12, is a pulley 13, over which extends a flexible connection 14. The one end of the flexible connection 14 has an additional pulley 15 connected thereto and suspended from the axis of the pulley 15, is an arcuate bar or supporting member 16, the latter being covered with felt or other soft material. This arcuate supporting bar 16 receives the tubular member 1 therethrough and the opposite end of the flexible connection 14 is adapted to be engaged with a securing hook or the like 17 carried on the one leg of the supporting device, whereby to suspend the member 1 in the bar 16 at any desired height in the support. The member 1 may, therefore, be adjusted to various heights with respect to the ground and an additional flexible connection 18 which has its ends connected, respectively, with the end telescoping sections of the tubular member 1, extends over the pulley 15 which is suspended from the pulley 13 and through this medium, the tubular member 1 may be readily adjusted and guided forwardly or rearwardly, through the support. An additional support is also provided, which consists of a circular or bandlike head piece 19, to which are secured a plurality of supporting hooks 20, the lower ends of which are tapered to be readily engaged with the surface of the ground. A plurality of hook members 21 are also secured to the head piece 19 and a sack or other flexible connection 22 is adapted to be suitably engaged with the hook members on said head piece, whereby the fruit which is severed from the trees, through the medium of the gathering member above referred to, may be deposited therein.

In practice, when it is desired to remove fruit from the trees, the support for the gathering member is properly disposed adjacent the tree and said tubular member properly supported therein. The tubular member is then properly adjusted in the support and extended, whereupon the operator grasping the handle 4, of the lower section thereof, swings said tubular member to the proper position to receive the fruit in the catching and severing portion of the device, at the upper end thereof. As this upper or catching end of the device is disposed through the branches of the trees, it will be seen that the upstanding guard walls or wings 9 will protect the hook members from engaging the various branches, but should for any reason whatsoever, the hook members become engaged with the branches, the same will readily yield and spring back to their original positions, when disengaged, as the same are formed of spring metal. The device is moved through the trees until the desired piece of fruit is received in the space between the hook members 6 and 7 and the pins or guide members 8, whereupon a torsional movement of the tubular member 1 will permit the hooks to be engaged with the stem of said piece of fruit, and a continued torsional and pulling movement will sever said piece of fruit from the branch. Another means of severing the fruit, is by moving the device into position to receive the same in the space between the pins and hooks and then forcing the guide edges 10 of the band 5 against the stems thereof to readily sever the same. As the fruit falls from its branch, the same will be guided against the hooks, pins and guard walls to the tapering head member, 3, where it is conducted through the tubular member 1, to the hand of the operator. In view of the fact that the guard walls, pins, and hooks are covered with a soft material, and inasmuch as the tubular member 1 is lined with a similar material, the fruit as it contacts with the parts just mentioned, will not be bruised. As the operator receives the fruit in his hand, the same is disposed in the sack carried by the other support at an adjacent point.

From the foregoing description of the construction of my improved device, the operation thereof will be readily understood and it will be seen that I have provided a simple, inexpensive and efficient means for carrying out the objects of the invention.

While I have particularly described the elements best adapted to perform the functions set forth, it is obvious that various changes in form, proportion and in the minor details of construction may be resorted to without departing from the spirit or sacrificing any of the principles of the invention.

Having thus described this invention, what is claimed is:—

1. A fruit gatherer comprising a tubular member formed of telescoping sections adjustably secured together, the free end of the outer section being flared outwardly, a plurality of hooks carried on the last mentioned end of the tubular member and arranged in series thereon, guide pins carried on the last mentioned end of the tubular member between the series of hook members, and a pair of guard walls carried on the flared end of the tubular member on opposite sides of one of the series of hook members thereon, the outer edges of said walls extending beyond the hooks and beveled.

2. A fruit gatherer comprising a tubular member formed of telescoping sections adjustably secured together, the free end of the outer section being flared outwardly, an endless band secured to the flared portion of said tubular member and having its outer edges sharpened to form knife edges, a plurality of hooks carried on said band and arranged in series thereon, guide pins also carried on said band between the series of hooks, said pins and hooks extending longitudinally of the tubular member, and a pair of angular guard walls also carried on said band and extending longitudinally of the tubular member to afford a protection for said hook members and also provide a guiding means for the fruit as the same is severed.

In testimony whereof I hereunto affix my signature in the presence of two witnesses.

MICHIEL H. PATTON.

Witnesses:
EDITH GEARY,
ELSIE GEARY.

Copies of this patent may be obtained for five cents each, by addressing the "Commissioner of Patents, Washington, D. C."